US010331887B2

United States Patent
Huth

(10) Patent No.: US 10,331,887 B2
(45) Date of Patent: Jun. 25, 2019

(54) EMBEDDED SYSTEM

(71) Applicant: Robert Bosch GmbH, Stuttgart (DE)

(72) Inventor: Christopher Huth, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 214 days.

(21) Appl. No.: 15/351,854

(22) Filed: Nov. 15, 2016

(65) Prior Publication Data

US 2017/0169221 A1    Jun. 15, 2017

(30) Foreign Application Priority Data

Dec. 10, 2015   (DE) .................. 10 2015 224 868

(51) Int. Cl.
  *G06F 21/00*    (2013.01)
  *G06F 21/55*    (2013.01)
  *G06F 1/28*    (2006.01)
  *G06F 9/4401*    (2018.01)

(52) U.S. Cl.
  CPC .............. *G06F 21/558* (2013.01); *G06F 1/28* (2013.01); *G06F 9/4406* (2013.01); *G06F 21/554* (2013.01); *G06F 21/556* (2013.01); *G06F 2221/034* (2013.01)

(58) Field of Classification Search
  CPC ........ G06F 21/558; G06F 1/28; G06F 9/4406; G06F 2221/034
  USPC ......................................................... 726/23
  See application file for complete search history.

(56) References Cited

U.S. PATENT DOCUMENTS

| | | | | |
|---|---|---|---|---|
| 5,341,503 | A * | 8/1994 | Gladstein ........... | G01R 31/3648 320/136 |
| 7,612,656 | B2 * | 11/2009 | Koie .................... | G08B 25/016 340/425.5 |
| 7,877,621 | B2 * | 1/2011 | Jacoby .................... | G06F 21/55 713/300 |
| 8,332,945 | B2 * | 12/2012 | Kim .......................... | G06F 1/28 726/24 |
| 9,268,938 | B1 * | 2/2016 | Aguayo Gonzalez ...................... | G01R 21/00 |
| 2005/0144612 | A1 * | 6/2005 | Wang ........................ | G06F 8/65 717/168 |
| 2007/0006306 | A1 * | 1/2007 | Seifert .................. | G06F 21/554 726/22 |
| 2010/0168727 | A1 * | 7/2010 | Hancock ................ | A61B 18/18 606/33 |
| 2012/0186691 | A1 * | 7/2012 | Bridges .................. | A62C 35/15 141/2 |

(Continued)

FOREIGN PATENT DOCUMENTS

DE    102013213314 A1    1/2015

*Primary Examiner* — Mahfuzur Rahman
(74) *Attorney, Agent, or Firm* — Norton Rose Fulbright US LLP; Gerard Messina

(57) ABSTRACT

An embedded system wherein the system includes a computer, a watchdog, and an electrical power supply. The computer is electrically connected to the power supply. The power supply is connected in terms of measurement to the watchdog. The watchdog is configured in such a way that the watchdog measures a power consumption of the computer, ascertains a first power signature on the basis of the power consumption, carries out a comparison of the first power signature with a specified second power signature, and introduces specified measures if the comparison fails.

8 Claims, 3 Drawing Sheets

(56) References Cited

U.S. PATENT DOCUMENTS

| | | | |
|---|---|---|---|
| 2014/0108843 A1* | 4/2014 | Choho | G06F 1/3228 |
| | | | 713/323 |
| 2014/0143597 A1* | 5/2014 | Chen | G06F 11/0793 |
| | | | 714/15 |
| 2014/0223554 A1* | 8/2014 | Roden, III | G06F 21/552 |
| | | | 726/22 |
| 2015/0254017 A1* | 9/2015 | Soja | G06F 3/0622 |
| | | | 711/103 |
| 2016/0232010 A1* | 8/2016 | Dicks | G06F 8/654 |

* cited by examiner

EMBEDDED SYSTEM

CROSS REFERENCE

The present application claims the benefit under 35 U.S.C. § 119 of German Patent Application No. DE 102015224868.2 filed on Dec. 10, 2015, which is expressly incorporated herein by reference in its entirety.

FIELD

The present invention relates to an embedded system secured against attacks.

BACKGROUND INFORMATION

An electronic computer that is incorporated ("embedded") in a technical working environment is commonly referred to in information technology as an embedded system. Here, the computer typically performs monitoring, control, or regulating functions, or is responsible for a form of the data or signal processing.

Conventionally, embedded systems are used in a large number of areas of application and equipment. In the case of complex overall systems, for example so-called sensor networks, this sometimes includes a large number of individual systems that for example are networked wirelessly.

German Patent Application No. DE 10 2013 213314 (A1) describes a method for storing at least one calculable integrity measurement value in a first memory area of a memory of a component, the at least one calculable integrity measurement value being ascertained as a test value of a software module of the component, and stored in the first memory area by an invariable write unit. In this way, a balance is sought between safety requirements and saving time during a booting or start process.

SUMMARY

The present invention provides an embedded system secured against attacks.

An advantage of this solution is its improved protection against harmful software and system crashes. To this extent, a system according to the present invention is able to determine whether it is currently being attacked, or whether its software is displaying trustworthy, expected, and normal behavior.

The proposed approach here is based on the basic idea of analyzing the power consumption of one or more components in a system in order to recognize an untrustworthy behavior. The corresponding analysis component can be a hardware module installed in the system, designated in the following as "watchdog." Countermeasures can be carried out when an unusual power signature is recognized in order to bring the system back to a trustworthy state.

In this way it can be recognized whether hardware components have really been used, for example whether a physical random number generator or a structure provided for the secure production or storing of secret keys (physical unclonable function) was really used to obtain a highly secure random number or, in the latter case, an authentic response.

Energy-consuming attacks on embedded devices having a limited battery capacity are also easy to recognize according to the present invention. A countermeasure can be to put the device into sleep mode.

If malicious software is recognized, e.g., if packets are sent outside the standard time window—sensor nodes typically send approximately one message per hour—then the system can be reset by reloading a trustworthy firmware from the read-only memory (ROM).

A system crash can be detected if the microcontroller, in contrast to all the other components, has a high energy consumption, but only when this behavior is not expected over a defined time interval. In this case, the watchdog can initiate a restart of the system.

Current peaks, for example of a radio interface, can indicate an active attack. The same conclusion is indicated if the network traffic within a business is monitored and too much data is received or sent.

Malware, active attacks, or system crashes can be acquired via a power signature model. As a function of the capacities of the device, this model can be very economical or can make higher demands with regard to its memory requirements.

Side channel properties, as normally used in the context of so-called side channel attacks—such as a power consumption profile of the main processor (central processing unit, CPU), memory side attacks and errors, access to the registers, etc.—are used to confirm normal behavior of the software.

The watchdog can be implemented in hardware or in at least one module that cannot be modified by a possibly malicious computer. To this extent, it represents the manipulation-proof root (root of trust) of a security chain (chain of trust) in the sense of the design known as "trusted computing" (TC).

Through the measures described herein, advantageous developments and improvements of the present invention are possible.

BRIEF DESCRIPTION OF THE DRAWINGS

Exemplary embodiments of the present invention are shown in the figures and are explained in more detail below.

DETAILED DESCRIPTION OF EXAMPLE EMBODIMENTS

Figure 1:
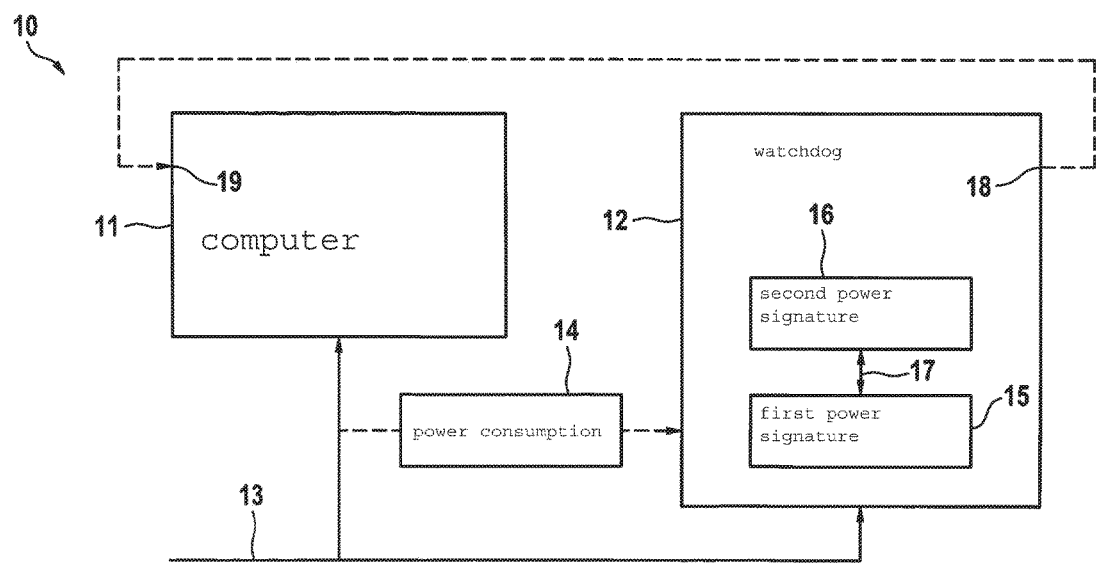
FIG. 1 shows the block diagram of a system according to a first specific embodiment.

An embedded system (10) that includes a power supply (13) of the system (10), a computer (11), and the watchdog (12) acting according to the present invention, is shown in FIG. 1. The watchdog (12) measures the power consumption (14) of the computer (11). If the power consumption (14) is above or below a particular threshold for a defined time span, specified measures (18) can be introduced by the watchdog (12). The watchdog (12) can also recognize the values of the power consumption (14) that could also indicate unnatural behavior.

Thus, the watchdog (12) constantly performs a comparison (17) of the first power signature (15), ascertained on the basis of the currently measured power consumption (14), with an expected second power signature (16). In the simplest case, this can take place using a mean value of the power consumption (14), or according to somewhat more sophisticated models. Because, with regard to the power consumption (14), the sending and receiving of WLAN data is more costly than purely local calculations, too much data traffic, or no data traffic at all, can be reliably recognized even on the basis of a mean value of the power consumption (14).

Figure 2:
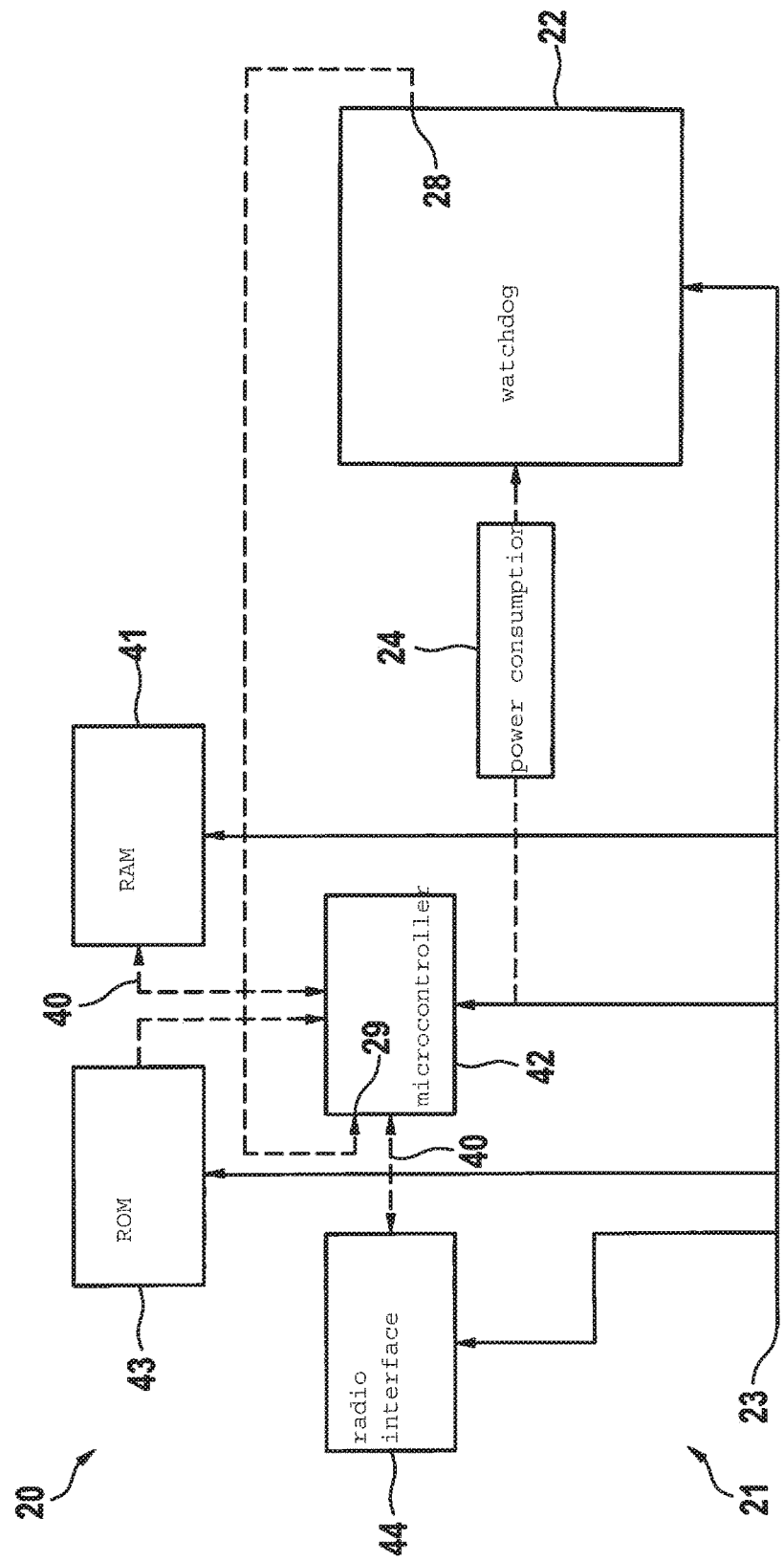
FIG. 2 shows the block diagram of a system according to a second specific embodiment.

The computer (21) according to FIG. 2 includes a microcontroller (42), a random-access memory (41), a read-only memory (43), a radio interface (44), and data transmission paths (40) that connect the microcontroller (42) to the random-access memory (41), to the read-only memory (43), and to the radio interface (44). In this specific embodiment, the system (20) is configured such that the power consumption (24) is measured only between the power supply (23) and the microcontroller (42).

Figure 3:
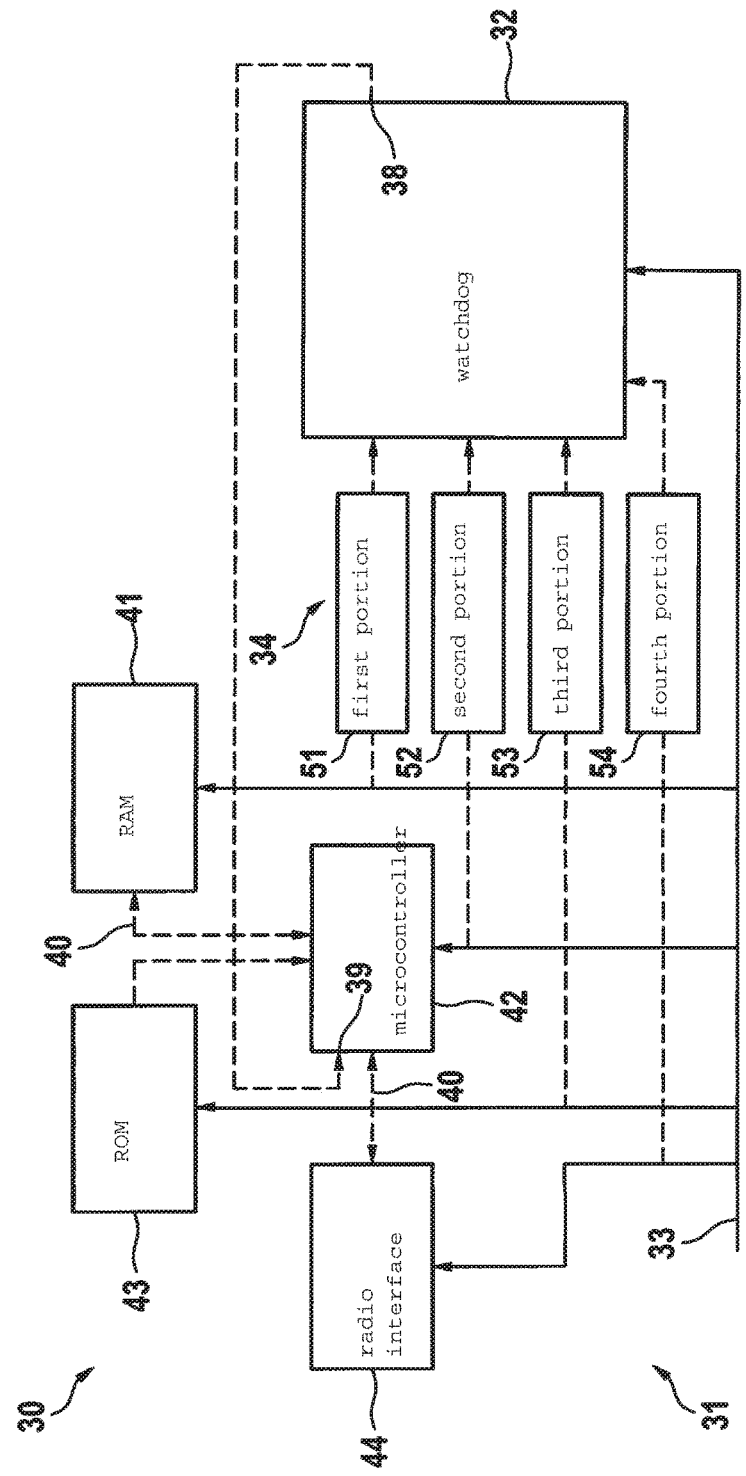
FIG. 3 shows the block diagram of a system according to a third specific embodiment.

In the scenario in FIG. 3, the watchdog (32) individualizes—with regard to the first power signature (15)—the microcontroller (42), the random-access memory (41), the read-only memory (43), and the radio interface (44) of the system (30). This represents a compromise between increased hardware outlay, e.g. in the form of additional wiring, on the one hand and a refined comparison (17) of the first power signature (15) with the second power signature (16) on the other hand, which in turn permits more differentiated measures (38). In this way, an unusual behavior of an individual component (41, 42, 43, 44) can also be determined. If for example the radio interface (44) receives more data packets than usual, this should indicate an active attack on the system (30).

What is claimed is:

1. An embedded system, comprising:
   a computer;
   a watchdog; and
   an electrical power supply, the computer being electrically connected to the power supply, the power supply being connected in terms of measurement to the watchdog;
   wherein the watchdog is configured in such a way that the watchdog measures a power consumption of the computer, ascertains a first power signature on the basis of the power consumption, carries out a comparison of the first power signature with a specified second power signature, and introduces specified measures if the comparison fails,
   wherein the watchdog is electrically connected to the power supply,
   wherein the computer includes a microcontroller, a random-access memory, and data transmission paths, the transmission paths connect the microcontroller at least to the random-access memory, and the system is configured in such a way that the power consumption includes a first portion, measured between the power supply and the random-access memory, and a second portion, measured between the power supply and the microcontroller, and the watchdog is electrically connected to the power consumption of the first and second portions.

2. The embedded system as recited in claim 1, wherein the watchdog is connected in terms of signaling to the computer, and the system is configured in such a way that the measures include a restart of the computer.

3. The embedded system as recited in claim 1, wherein the computer includes in addition a read-only memory, the transmission paths connect the microcontroller to the read-only memory, and the system is configured in such a way that the power consumption in addition includes a third portion, measured between the power supply and the read-only memory.

4. The embedded system as recited in claim 3, wherein the system is configured in such a way that the measures include a loading of a trustworthy firmware from the read-only memory onto the microcontroller.

5. The embedded system as recited in claim 4, wherein the computer further includes a radio interface, the transmission paths connect the microcontroller to the radio interface, and the system is configured in such a way that the power consumption includes a fourth portion measured between the power supply and the radio interface.

6. The embedded system as recited in claim 5, wherein the second power signature is selected such that the comparison fails when the fourth portion indicates a reception of a large quantity of data via the radio interface, and the system is configured in such a way that the measures put the system into a sleep mode.

7. The embedded system as recited in claim 6, wherein the second power signature is selected such that the comparison fails when the fourth portion indicates a sending of data via the radio interface outside a specified time window.

8. The embedded system as recited in claim 6, wherein the second power signature is selected such that the comparison fails when the power consumption is above or below a specified threshold over a specified time span.

* * * * *